Oct. 5, 1926.
1,602,042
E. L. PEARSON
THREE-WHEEL VEHICLE CHASSIS
Filed June 29, 1925
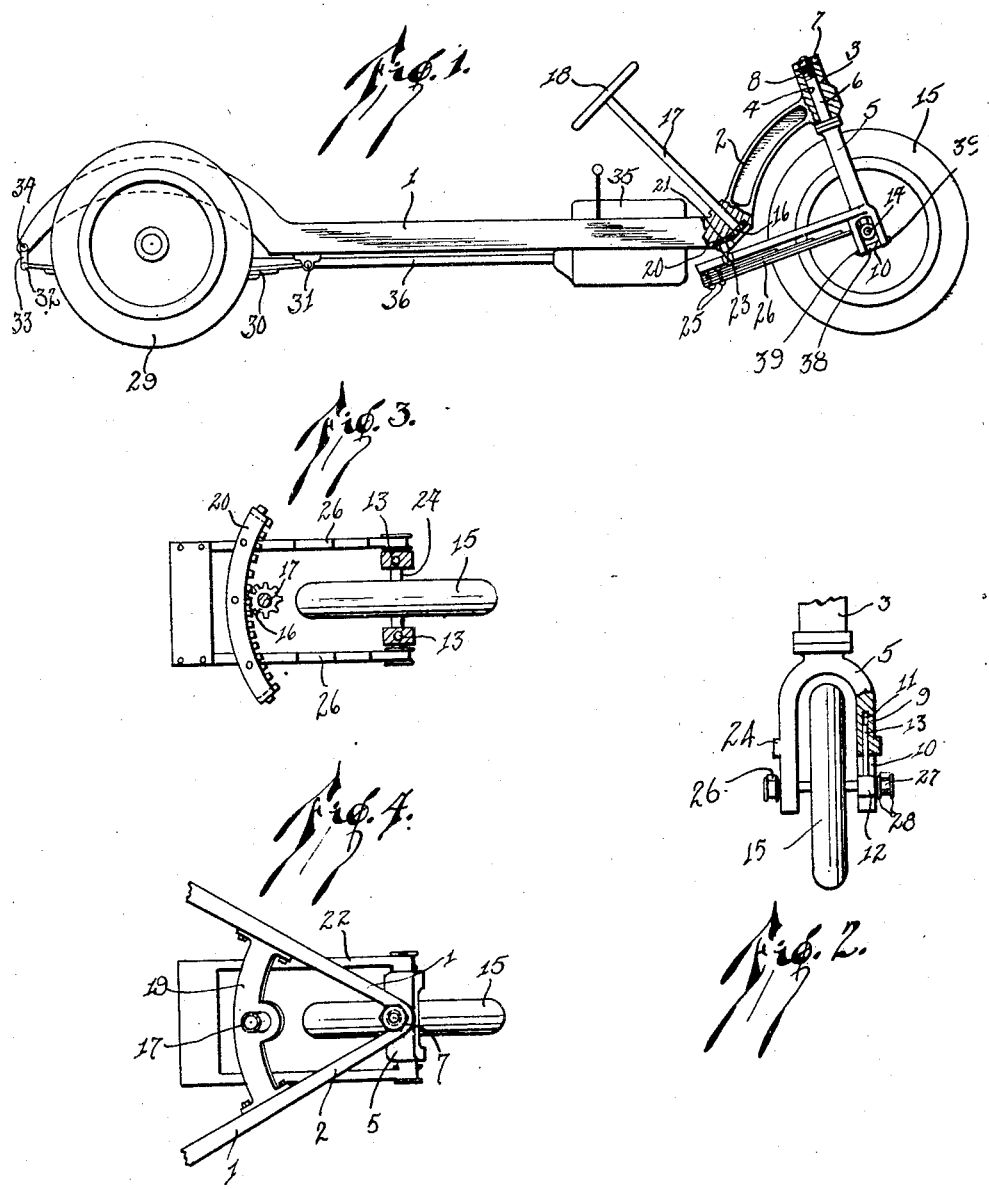
INVENTOR
E. L. PEARSON
BY
ATTORNEYS Patented Oct. 5, 1926.

1,602,042

UNITED STATES PATENT OFFICE.

ERNEST L. PEARSON, OF CHICAGO, ILLINOIS.

THREE-WHEEL-VEHICLE CHASSIS.

Application filed June 29, 1925. Serial No. 40,309.

My invention relates to improvements in three wheel vehicle chassis, and it consists in the combinations, constructions and arrangements herein described and claimed.

An object of my invention is to provide a three wheel chassis of the character which is particularly well adapted for use for light delivery motor vehicles, taxicabs, and the like, due to the fact that the vehicle may be turned about in a relatively small space, by virtue of the inherent construction of the chassis.

A further object of my invention is to provide a three wheel chassis of the character described in which particularly novel means is employed for mounting the fore wheel upon the chassis and for steering the vehicle.

A further object of my invention is to provide a three wheel chassis of the character described in which a spring support for the fore wheel is of such structure as to turn with the wheel, yet which possesses all of the advantages of a long quarter-elliptic spring.

A further object of my invention is to provide a three wheel chassis of the character described which is simple in construction, which is durable, and thoroughly practical for the purpose intended.

Other objects and advantages will appear in the following specification, and the novel features of the invention will be particularly pointed out in the appended claims.

My invention is illustrated in the accompanying drawings forming part of this application, in which Figure 1 is a side elevation of an embodiment of my invention, Figure 2 is a front elevation of the fore wheel of the chassis, Figure 3 is a sectional view substantially along the line 3—3 of Figure 1, and Figure 4 is a top plan view of a part of the mechanism illustrated in Figure 1.

In carrying out my invention I make use of a chassis frame, including two side members 1, which converge at their forward ends and which are secured to a V-shaped fork supporting member 2. This member 2 has an arcuate upwardly extending portion as shown in Figure 1 at the forward end thereof terminating in a bearing member 3. The bearing member 3 has a longitudinal bore 4 having its axis inclined 15° rearwardly from a vertical plane. A fore wheel supporting fork 5, having a bearing portion 6, is mounted in the bearing 3 by projection of the portion 6 into the bore from the underside thereof. The upper end of the portion 6 bears against an adjustable threaded thrust bearing 8, terminating at its outer end with an angular threaded portion 7 arranged for engagement with a wrench, whereby the thrust bearing may be moved longitudinally in the bore 4 which has its upper portion threaded to receive the threads of the thrust bearing.

The lowermost portion (see Figure 2) of the bifurcated portions 9 of the fork 5 have longitudinally extending slots 10 therein. The bores 11 extend upwardly through the portions 9 and communicate with the slots 10 at their lowermost ends. Shaft bearing members 12 are slidably mounted within the slots 10 and each has a nut 13 extending upwardly and radially therefrom which is slidably received within the bore 11.

A shaft 14 is rotatably mounted in the bearing members 12 and a fore wheel 15 is carried by the shaft 14.

Means for seating the fore wheel and for providing resilient support thereto is provided in a pinion 16 carried at the lowermost end of the steering column 17 which has its lower bearing in the member 2.

A steering wheel 18 is disposed at the upper end of the column 17, whereby the pinion 16 may be rotated at will.

An arcuate slot 21 is provided in the underside of the portion 19 of the member 2 which is substantially T-shaped in cross section and which communicates at its mid point with that portion of the member 2 at which the pinion 16 is disposed.

An arcuate member 20, substantially T-shaped in cross section is provided, and has a toothed rack portion 22 formed on that side thereof adjacent to the pinion 16, whereby the teeth of the rack may engage with the pinion 16 to move the member 20 when the pinion is rotated.

The member 20 is secured at its lower side to a pair of spaced apart parallel rods 24, by means of fish plates 23.

The outermost ends of the rods 24 are formed integral with the bifurcated portions 9 of the fork 5 (see Figure 2).

The innermost ends of the rods 24 are each provided with clamping members 25 by means of which quarter-elliptical steel springs 26 are secured thereto. These springs 26 lie parallel to the rods 24 and extend outwardly to a point above the axis of the shaft 14.

The shaft 14 extends at either end beyond the bearing members 12 and carries thereupon bearing members 27 which are rotatably mounted upon the shaft. These bearing members 27 have radial flanges 28 extending outwardly from the peripheral wall thereof at each side. The outermost ends of the spring 26 are permitted to bear directly upon that portion of the bearing members 27 between the flanges 28.

The chassis frame is provided with a pair of rear driving wheels 29 which are mounted upon the frame in precisely the same manner as the ordinary type of vehicle wheel, preferably by means of half-elliptical springs 30 secured at 31 to the frame and at 32 to a shackle 33 which is in turn secured at 34 to the frame.

An engine 35 is carried within the frame at a point beneath that portion of the chassis occupied by the driver's seat, and a propeller shaft 36 communicating with the motor 5 extends rearwardly through suitable differential connections to the shaft of the wheels 29.

From the foregoing description of the various parts of the device the operation thereof may be readily understood. My improved three wheel chassis is particularly well adapted for taxi service and for light delivery cars where the necessity for turning about in a narrow street is present.

One of the most important advantages of the construction is the independent spring support of each end of the axle 14 upon which the forewheel 15 is carried. This independent spring support permits the inner spring to give to a greater degree when the wheel is turned inwardly, thereby causing the entire forward portion of the chassis to be moved slightly to the inner side tending to throw the vehicle in the opposite direction, as in turning. Thus the vehicle is particularly stable while turning corners and the like.

The novel construction of the bearings 12 with their radially extending rods 13 provides a positive means for guarding against movement of the bearings, yet permits free and ample lateral movement of the bearings as by actuation of the springs.

The inclination of the shaft portion 6 of the fork and hence the inclination of the entire fork is such, as shown in Figure 1, as to produce a tendency to maintain the wheel in such a position as to drive the vehicle in a straight forward course.

The means for steering the wheel is positive in actuation and eliminates entirely the provision of connecting tie rods and other structure essential to the employing of two wheel steering devices.

Means for preventing the bearing members 12 from moving entirely out of engagement with the slots 10 of the bifurcated member 5 is provided in plates 38 which are disposed across the open ends of the slots and secured by means of rivets 39 to the opposite portions of the fork.

I claim:

1. A three wheel vehicle chassis of the character described comprising a frame, a pair of rear wheels for the frame, a fore wheel supporting fork rotatably mounted at the forward end of the frame, rearwardly extending members carried by the fork, means associated with the rearwardly extending member for oscillating said rearwardly extending members to steer the chassis, springs carried by said rearwardly extending members and having their outer ends in registration with the bifurcated portions of the fork, an axle shaft arranged to bear against said springs at the outermost end thereof, and in engagement with said fork, and a wheel carried by said axle shaft.

2. A three wheel vehicle chassis of the character described comprising a frame, a pair of rear wheels for the frame, a fore wheel supporting fork rotatably mounted at the forward end of the frame, rearwardly extending members carried by the fork, means associated with the rearwardly extending member for oscillating said rearwardly extending member to steer the chassis, springs secured to the rearmost portion of said rearwardly extending members and having their outer ends in registration with the bifurcated portions of the fork, and an axle shaft arranged to bear against said springs at the outermost end thereof, and in engagement with said fork, and a wheel carried by said axle shaft.

3. A three wheel vehicle chassis of the character described comprising a frame, a pair of rear wheels for the frame, a fore wheel supporting fork rotatably mounted at the forward end of the frame, a pair of rearwardly extending members carried by the fork, an arcuate rack supported by said rearwardly extending members, a pinion having its teeth in mesh with the teeth of said rack, a steering column for actuating said pinion, whereby the fore wheel may be steered, springs secured at the rearmost portion of said rearwardly extending members and having their outer ends in registration with the fork, an axle shaft having its ends disposed beneath the outermost ends of said springs and associated with said fork, and a wheel carried by said axle shaft.

4. A three wheel vehicle chassis of the character described comprising a frame, a pair of rear wheels for the frame, a fore wheel supporting fork carried by said frame at the foremost end thereof and mounted with its axis inclined forwardly from the frame, a pair of rearwardly extending members carried by the fork, an arcuate rack supported by said inwardly extending members, a pinion having its teeth in mesh with the teeth of said rack, a steering column for actuating said pinion, whereby the fore wheel may be steered, springs secured at the rearmost portion of said rearwardly extending members and having their outer ends in registration with the fork, an axle shaft having its ends disposed beneath the outermost ends of said springs and associated with said fork, and a wheel carried by said axle shaft.

5. A three wheel vehicle chassis, a fork rotatably carried by said chassis, the prongs of said fork having guide slots therein, an axle slidably received in said slots, rearwardly extending members carried by the fork, means associated with the rearwardly extending members for oscillating said members to steer the chassis, and springs carried by said members and bearing against the ends of said axle for resiliently connecting the axle to the fork.

ERNEST L. PEARSON.